United States Patent
Smalley, III

(10) Patent No.: US 7,765,747 B1
(45) Date of Patent: Aug. 3, 2010

(54) OMNI-DIRECTIONAL AIRFOIL AND METHOD FOR REDUCING WIND DAMAGE TO STRUCTURES

(76) Inventor: Arthur L. Smalley, III, 2582 Budde Rd., Spring, TX (US) 77380

( * ) Notice: Subject to any disclaimer, the term of this patent is extended or adjusted under 35 U.S.C. 154(b) by 639 days.

(21) Appl. No.: 11/355,755

(22) Filed: Feb. 16, 2006

Related U.S. Application Data

(63) Continuation-in-part of application No. 11/251,688, filed on Oct. 17, 2005, now abandoned.

(51) Int. Cl.
*E04H 9/14* (2006.01)

(52) U.S. Cl. .............................. 52/84; 105/1.2; 180/903; 296/180.1

(58) Field of Classification Search .................... 52/84, 52/198, 199, 24–26; 454/365, 366; 296/180.1–180.5; 343/705, 711, 713; 180/903; 105/1.02; D14/230, D14/231
See application file for complete search history.

(56) References Cited

U.S. PATENT DOCUMENTS

| | | | |
|---|---|---|---|
| 2,270,537 A | 1/1942 | Ludington | |
| 2,270,538 A | 1/1942 | Ludington | |
| 2,987,983 A * | 6/1961 | Solzman | 454/346 |
| 3,078,781 A * | 2/1963 | Jentoft | 454/355 |
| 3,280,524 A | 10/1966 | Hull | |
| 3,313,228 A * | 4/1967 | Cook | 454/341 |
| 3,650,198 A * | 3/1972 | Stone | 454/37 |
| 3,788,207 A * | 1/1974 | Doherty, II | 454/362 |
| 3,828,498 A | 8/1974 | Jones | |
| 4,005,557 A | 2/1977 | Kramer et al. | |
| 4,206,942 A | 6/1980 | Nudo et al. | |
| D401,594 S * | 11/1998 | Nishimura et al. | D14/230 |
| 5,918,423 A | 7/1999 | Ponder | |
| D421,439 S * | 3/2000 | Giuntoli | D14/230 |
| 6,435,932 B1 * | 8/2002 | Lynn | 446/30 |
| D467,242 S * | 12/2002 | Warner et al. | D14/230 |
| 6,601,348 B2 | 8/2003 | Banks et al. | |

* cited by examiner

*Primary Examiner*—Richard E Chilcot, Jr.
*Assistant Examiner*—William V Gilbert
(74) *Attorney, Agent, or Firm*—Brett T. Cooke; Gary L. Bush; Andrews Kurth LLP

(57) ABSTRACT

A method and apparatus for producing a downward, wind-induced lift force on a structure including attaching one or more omni-directional mushroom-shaped airfoil assemblies to the top of the structure which create a downward lift force as they are subjected to wind flow.

14 Claims, 5 Drawing Sheets

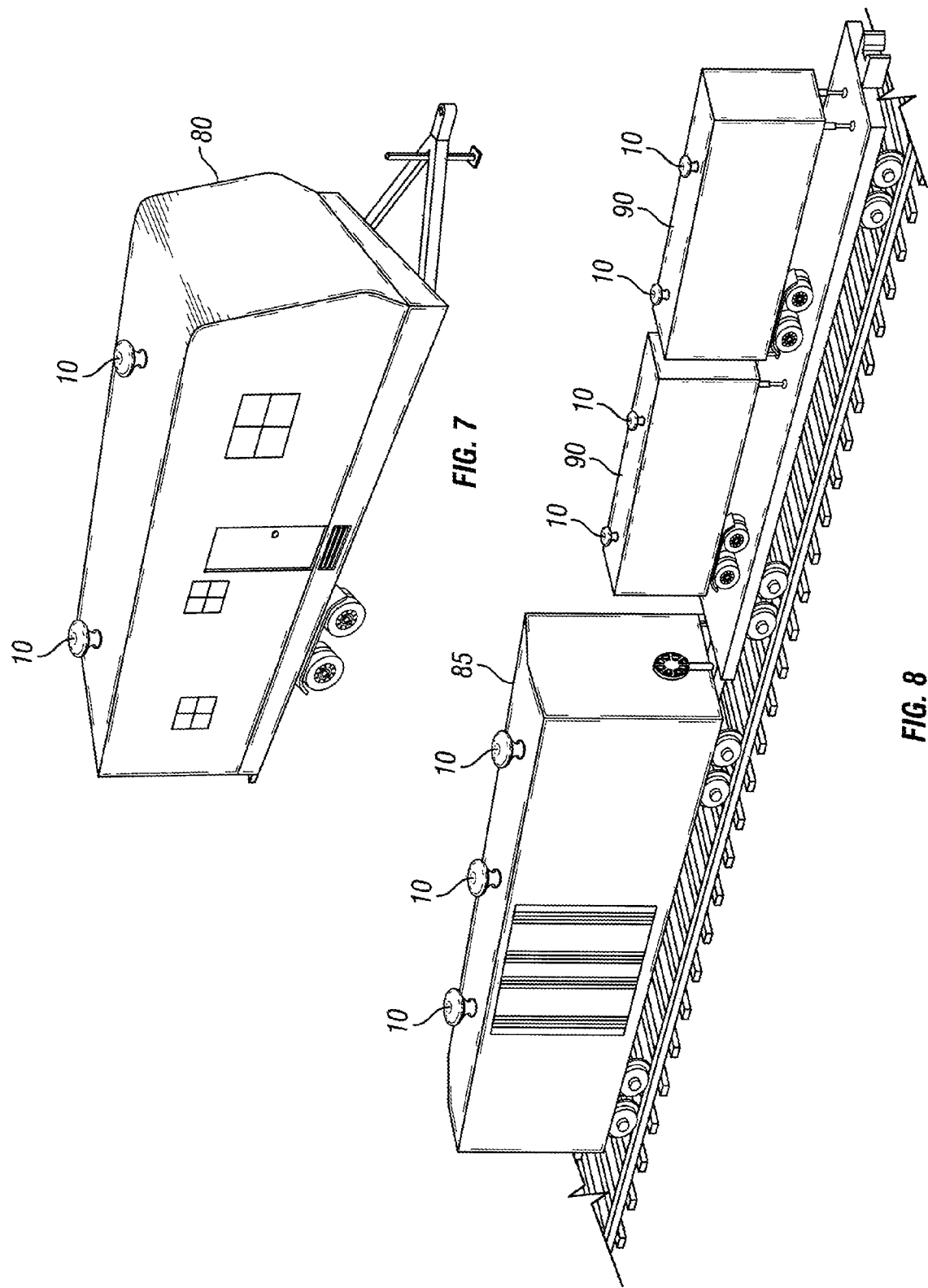

OMNI-DIRECTIONAL AIRFOIL AND METHOD FOR REDUCING WIND DAMAGE TO STRUCTURES

CROSS REFERENCE TO RELATED APPLICATION

This application is a continuation in part of patent application Ser. No. 11/251,688 filed on Oct. 17, 2005, the priority of which is claimed.

BACKGROUND OF THE INVENTION

1. Field of the Invention

This invention relates generally to the prevention of wind-induced damage to building structures and specifically to a method and apparatus for reducing the lifting forces which act on a rooftop due to the winds.

2. Description of the Prior Art

High wind gusts from typhoons, hurricanes, tropical storms, tornados and severe thunderstorms can wreak significant damage to building structures. In addition to missile hazards created when wind gusts cause debris to become airborne, wind damage may occur due to essentially laminar wind flow over the top of a building structure which creates lift and shear forces that can cause a roof to separate from the building.

A good discussion of the applicable aerodynamics is contained in John D. Anderson, Jr., *Introduction to Flight*, McGraw-Hill Publishing Company (3d ed. 1989). Simplistically put, due to the laws of conservation of energy and momentum, when an object is placed into a flow field, the mass flow (and hence the product of the density, velocity and area of flow) in the flow field at the windward and leeward side of the object are equal. This relation ship is referred to as the continuity equation. When the flow field is able to move smoothly around the object, the generally parallel (laminar) incident streamlines (lines which are everywhere parallel to the direction of fluid flow at a given instant) expand to envelope the object and collapse downstream of the object to form generally parallel laminar streamlines again. Such flow is referred to as attached flow. Thus, when the wind flows around a building, the streamlines flowing up over the roof cover a greater distance than the streamlines flowing along the side of the building. For attached flow, the flow over the roof may have a greater velocity than the flow along the side of the building, which, according to Bernoulli's equation, results in reduced pressure above the rooftop and resultant lift forces acting on the rooftop. Additionally, the wind creates shear forces at the roof surface due to friction. The lift and shear forces on the rooftop may cause the roof to separate from the building.

Numerous proposals exist to reduce the lift forces which act on rooftops. For example, U.S. Pat. No. 2,270,537 and U.S. Pat. No. 2,270,538 issued to Ludington, U.S. Pat. No. 3,280,524 issued to Hull, U.S. Pat. No. 3,828,498 issued to Jones, U.S. Pat. No. 4,005,557 issued to Kramer et al., and U.S. Pat. No. 5,918,423 issued to Ponder all disclose apparatus for mounting to a rooftop to cause flow separation at the rooftop. Flow separation, where the streamlines separate from the rooftop surface and form eddies and sometimes random, disorganized flow, results from a severe adverse pressure gradient and generally causes a drastic loss of overall lift. Such apparatus are known as spoilers.

Occasionally, flow separation results in well defined vortices. When the vortices flow close to a rooftop surface, the low pressure caused by the vortices can create localized suction forces which can damage rooftops. Particularly problematic are winds incident to a building at its corner which tends to create vortices along two generally orthogonal axes across a flat rooftop. U.S. Pat. No. 6,601,348 issued to Banks et al. discloses airfoil-shaped members for mounting to the windward of a rooftop which are designed to interrupt the formation of vortices along a rooftop.

3. Identification of Objects of the Invention

A primary object of the invention is to provide a method and apparatus for reducing lift forces which act on a rooftop by creating downward-facing lift forces.

Another object of the invention is to provide a method and apparatus for reducing lift forces which act on a rooftop which is effective regardless of the wind direction.

Another object of the invention is to provide a method and apparatus for reducing lift forces which act on a rooftop which is esthetically pleasing.

Another object of the invention is to provide a low cost method and apparatus for reducing lift forces which act on a rooftop.

Another object of the invention is to provide a method and apparatus for reducing lift forces which is suitable for use on both flat rooftops and gabled rooftops.

Another object of the invention is to provide a method and apparatus for reducing lift forces on trailers, semi-trailers, mobile homes, freight containers, and vehicles.

SUMMARY OF THE INVENTION

The features identified above, as well as other features of the invention are incorporated in a method and apparatus for producing a downward, wind-induced lift force on a rooftop, trailer or vehicle including attaching one or more omni-directional, mushroom-shaped airfoil assemblies to the top which create a downward lift force as they are subjected to wind flow. According to one embodiment, the omni-directional airfoil assembly includes a generally planar airfoil supported by a pedestal or base. The airfoil assembly has an upper and a lower airfoil surface, with the lower surface having a greater curvature than the upper surface. In other words, the airfoil is characterized by airfoil sections which have a mean camber line that falls below the chord line to define an airfoil which produces lift in a downward direction.

The airfoil ideally has a circular planform and is symmetric about an axis perpendicular to a plane which is parallel to the chord lines of the airfoil. For simplicity, this axis is referred to herein as the vertical axis. Because the airfoil is circular and symmetrical about the vertical axis, leading edges and trailing edges are symmetrical, and their determination is dependent only on the incident wind direction.

Preferably, a plurality of omni-directional airfoil assemblies is mounted to a rooftop of a house, trailer, vehicle, container, etc. to create a sufficient downward lift force. The omni-directional airfoil assemblies may ideally be used on both gabled and flat rooftops.

BRIEF DESCRIPTION OF THE DRAWINGS

The invention is described in detail hereinafter on the basis of the embodiments represented in the accompanying figures, in which:

FIG. 7 is a perspective view of a camper-trailer employing a number of omni-directional airfoil assemblies of FIG. 1; and FIG. 8 is a perspective view of a rail car and semi-trailers employing a number of omni-directional airfoil assemblies of FIG. 1.

DESCRIPTION OF THE PREFERRED EMBODIMENT OF THE INVENTION

Figure 1:
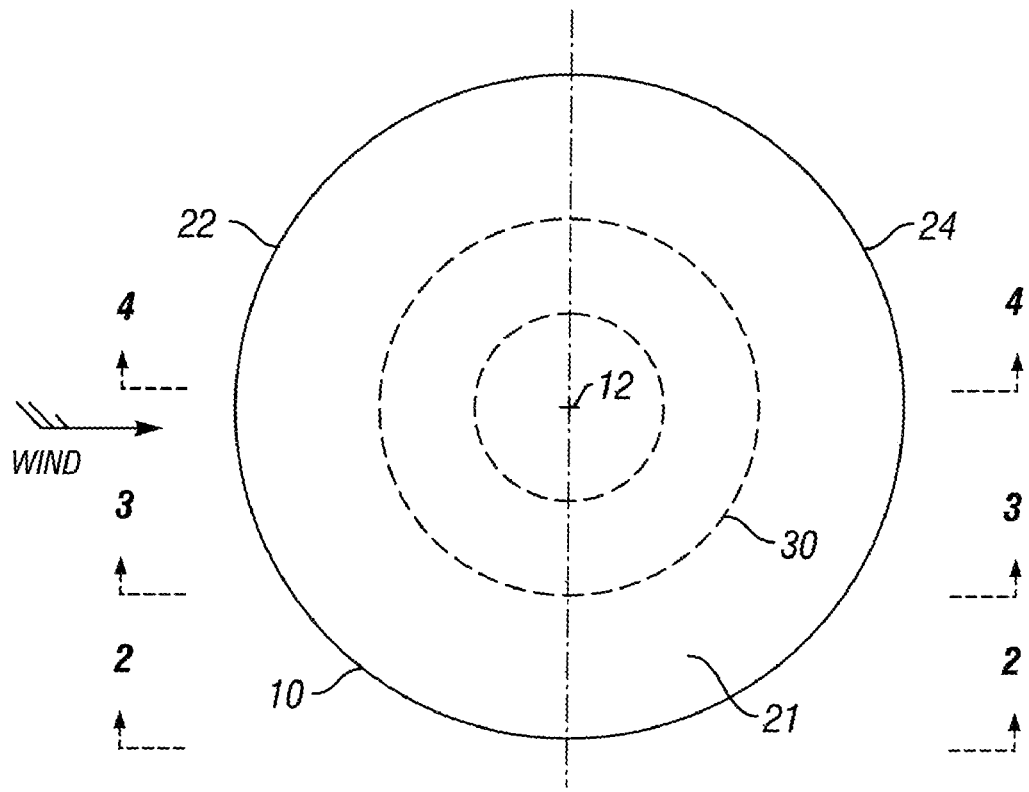
FIG. 1 is a plan view of an omni-directional airfoil assembly according to one embodiment of the invention for mounting to a rooftop to create a wind-induced downward force.
Figure 2:
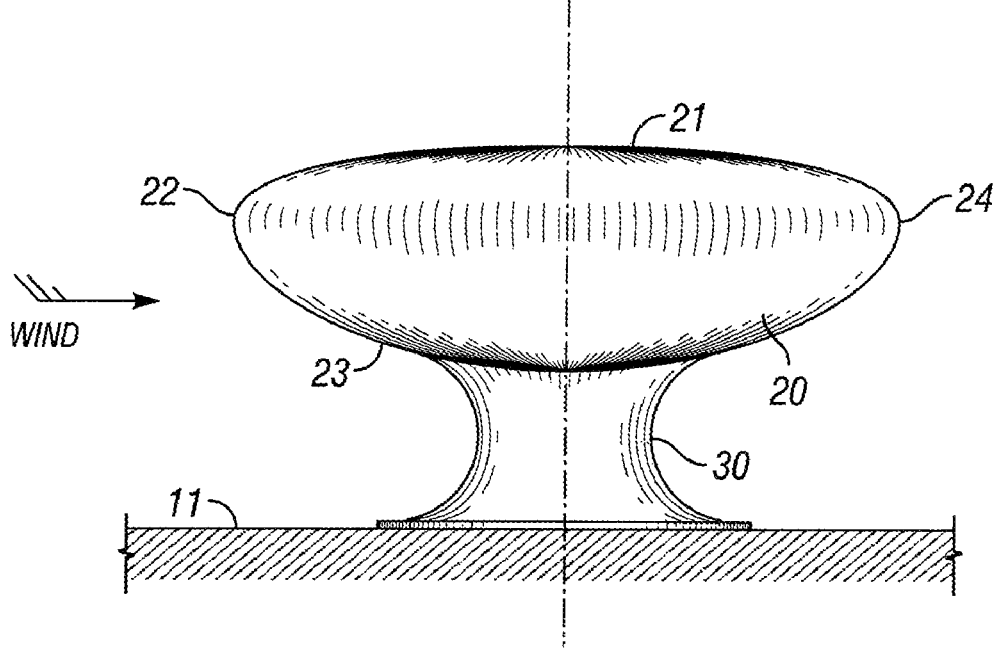
FIG. 2 is a side view cross-section of the omni-directional airfoil assembly of FIG. 1 taken along lines 2-2 of FIG. 1.

FIGS. 1 and 2 illustrate an omni-directional airfoil assembly 10 for mounting to a roof surface 11 according to one embodiment of the invention. Airfoil assembly 10 is preferably symmetric about vertical axis 12 and is composed of an airfoil 20 and a lower aerodynamic base or pedestal 30. The term "vertical" as used in describing vertical axis 12 is relative; it is used with reference to airfoil assembly 10 but not necessarily with reference to the earth or to roof surface 11. Because airfoil 20 is intended to function for winds from any direction, its leading edge 22 and trailing edge 24 are preferably identical, and the definition of which end is which depends only on the wind direction at a given instant. As shown in FIG. 1, a dashed wind line 13 is drawn perpendicular to the direction of the incident wind. The outermost perimeter of the omni-directional airfoil 20 anywhere to the windward (left) of the wind line 13 is a leading edge 22, and the outermost perimeter of the omni-directional airfoil 20 anywhere to the leeward (right) of the wind line 13 is a trailing edge 24.

The lower base or pedestal 30 of airfoil 10 is used to provide a stand on which to mount the airfoil 20 to roof surface 11. Preferably, lower base 30 is symmetrical about vertical axis 12. Lower base 30 is preferably aerodynamically designed to prevent or minimize flow separation (stalling) at its lee side.

Figure 3:
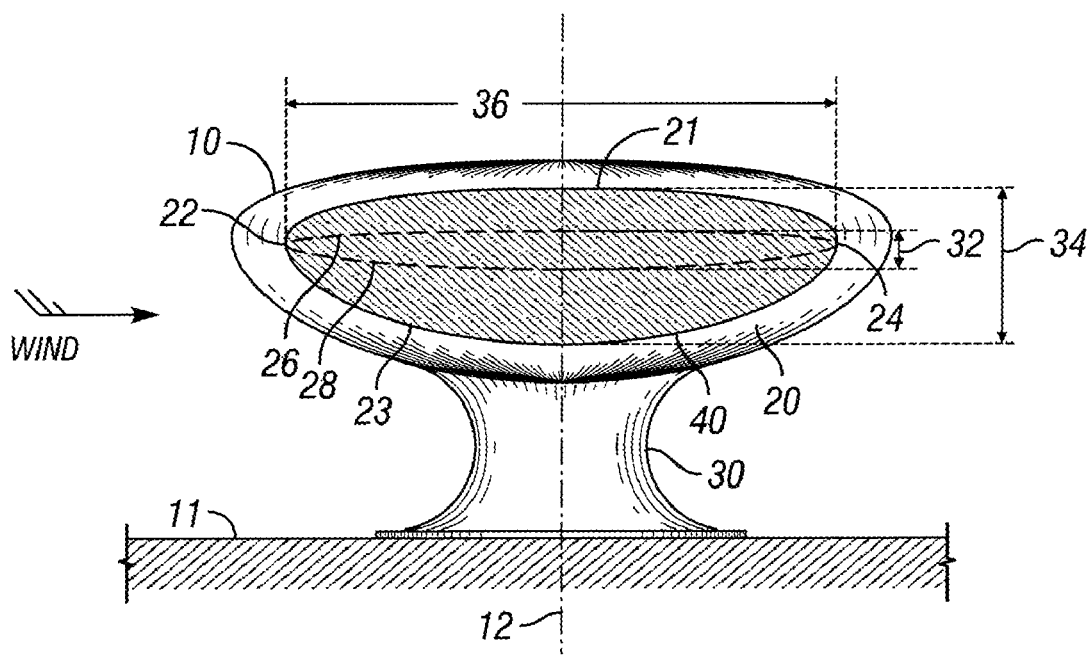
FIG. 3 is a side view cross-section of the omni-directional airfoil assembly of FIG. 1 taken along lines 3-3 of FIG. 1, showing airfoil characteristics.

FIG. 3 is a cross-section taken along lines 3-3 of FIG. 1 to reveal an airfoil section 40 and its characteristics. Airfoil cross-sections are traditionally taken in planes parallel to the incident wind. Employing standard airfoil definitions, a straight line connecting the leading edge 22 and the trailing edge 24 is referred to as the chord line, shown in FIG. 3 as dashed line 26. The mean camber line, which is the locus of points halfway between the upper airfoil surface 21 and the lower airfoil surface 23 as measured perpendicular to the mean camber line itself, is illustrated in FIG. 3 as dashed line 28. The camber 32 is the maximum distance between the mean camber line 28 and the chord line 26. Preferably, the maximum distance between the mean camber line 28 and the chord line 26 occurs midway between leading edge 22 and trailing edge 24. The thickness 34 is the maximum distance between the upper airfoil surface 21 and the lower airfoil surface 23. Preferably, the maximum distance between the upper airfoil surface 21 and the lower airfoil surface 23 occurs midway between leading edge 22 and trailing edge 24. The chord 36 is the length of the chord line 26, i.e., the chord is the straight-line distance between the leading edge 22 and the trailing edge 24.

Figure 4:
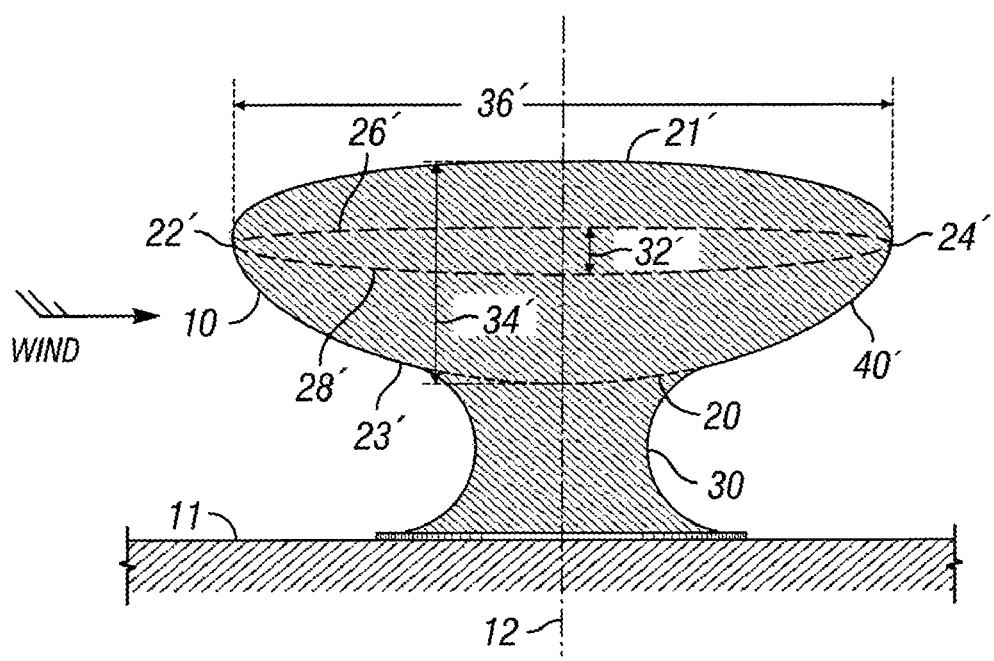
FIG. 4 is a side view cross-section of the omni-directional airfoil assembly of FIG. 1 taken along lines 4-4 of FIG. 1.

Obviously, the airfoil characteristics vary along the entire leading edge 22 (see FIG. 1) of the omni-directional airfoil assembly 10 due to the differing shape of the airfoil cross-sections 40. For example, FIG. 4 illustrates the theoretical airfoil characteristics for the airfoil section 40' of omni-directional airfoil assembly 10 taken along lines 4-4 of FIG. 1. The chord 36', camber 32', and thickness 34' are all proportionately larger than the chord 36, camber 32 and thickness 34 of the airfoil section 40 of FIG. 3. Additionally, the leading edge 22', trailing edge 24', upper airfoil surface 21', and lower airfoil surface 23' all occupy different positions with respect to roof surface 11 than the leading edge 22, trailing edge 24, upper airfoil surface 21 and lower airfoil surface 23 of the airfoil section of FIG. 3, which may result in varied performance. The prediction of the aerodynamic performance of airfoil section 40' of FIG. 4 is further complicated because the lower base or pedestal 30 prevents airflow along a portion of the lower airfoil surface 23'—the air must flow horizontally around the pedestal 30. Thus, the mean camber line 28' of FIG. 4 is only representative of the simplified airfoil section 40' considering only the airfoil 20 exclusive of the pedestal 30.

The aerodynamic lift, moment, and drag characteristics of omni-directional airfoil assembly 10 are controlled by the camber 32, the shape of the mean camber line 28, and to a lesser extent, the chord 36 and thickness 34 (or more accurately the overall thickness distribution). These parameters are preferably varied to obtain the desired characteristics. As airfoil design is well known in the art (see, for example, John D. Anderson, Jr., *Introduction to Flight*, McGraw-Hill Publishing Company (3d ed. 1989)), the selection of the airfoil parameters is not discussed further herein, except to specify that the mean chamber line 28 must fall generally below the chord line 26 in order for the wind-induced lift to be in a downward direction. Also, the lower base 30 design is preferably considered in determining the overall aerodynamic characteristics of a given omni-directional airfoil assembly 10 design. Computer modeling, simulation, and wind tunnel testing; as currently employed in the aviation and automotive industries, may be useful for designing an omni-directional airfoil assembly 10 with specified characteristics.

Although a central pedestal 30 is illustrated (FIGS. 1-2), other structures for supporting the upper airfoil section 20 may be employed, including one or more narrow bars or poles attached to the lower airfoil surface 23, not necessarily disposed at vertical axis 12.

Figure 5:
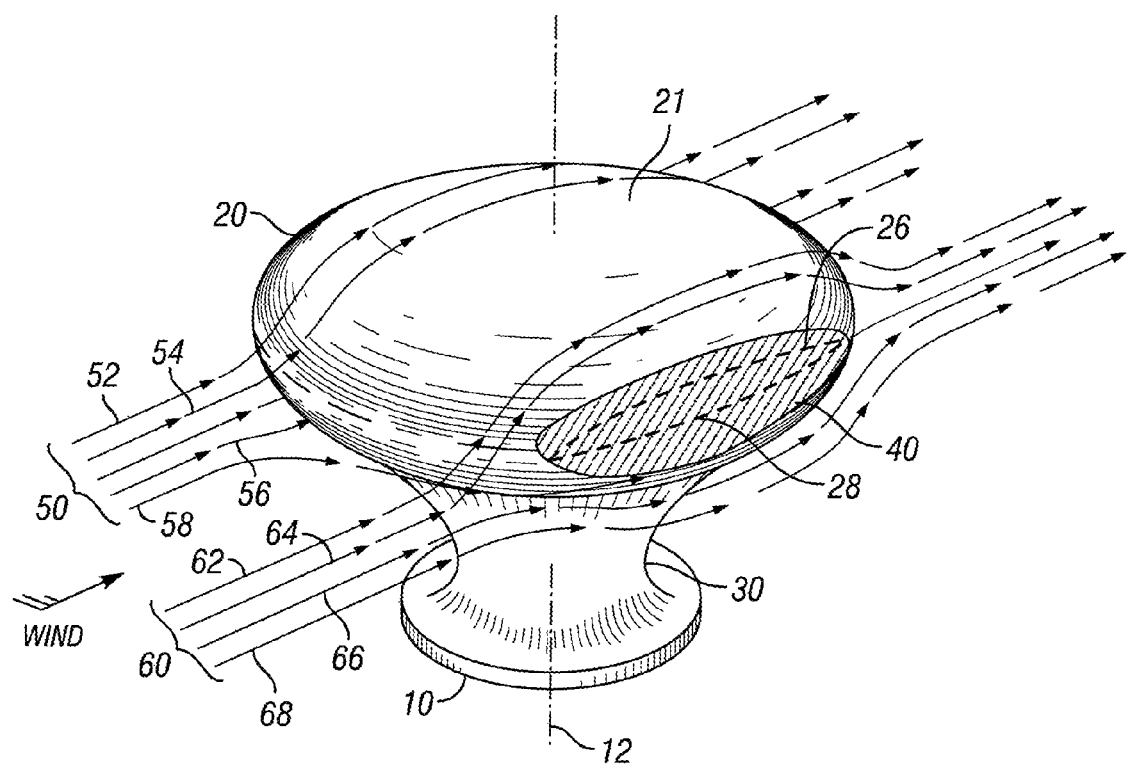
FIG. 5 is a perspective view of the cross-section of FIG. 3 showing streamlines incident upon the omni-directional airfoil assembly in two vertically oriented planes—one plane located at the omni-directional airfoil assembly center and containing the vertical airfoil axis and the other plane located at and parallel to the cutaway section.

FIG. 5 is a perspective view of the omni-directional airfoil assembly 10 according to one embodiment of the invention shown in partial cross-section. Two sets of streamlines 50, 60 are drawn to illustrate the movement of the fluid around the airfoil assembly 10. The first set 50 of streamlines is generally oriented in a vertical plane which includes vertical axis 12. In other words, the incident set 50 of streamlines is at the center of airfoil 10. Of the streamline set 50, the two upper streamlines 52, 54 flow over the upper airfoil surface 21 with little deflection, while the two lower streamlines flow downward and outward around pedestal 30 with greater deflection. Provided the set 50 of streamlines remains attached, i.e., the flow does not separate, the lower streamlines 56, 58 travel a greater distance than the upper streamlines 52, 54 in the same time. Similarly, streamline set 60 is generally oriented in a vertical plane which sections the airfoil 10 as shown in FIG. 5. Due to the shape of the airfoil section 40 (with the mean camber line 28 falling below the chord line 26), of the second streamline set 60, the upper streamlines 62, 64 flow over the upper airfoil surface 21 with little deflection, and the corresponding lower streamlines 66, 68 flow under the lower airfoil surface 23 with greater deflection.

The greater velocity of the lower streamlines 56, 58, 66, 68 with respect to their corresponding upper streamlines 52, 54, 62, 64, respectively, results in a decreased pressure below lower airfoil surface 23 compared to the pressure above upper airfoil surface 21, which translates into a downward lift force.

Figure 6:
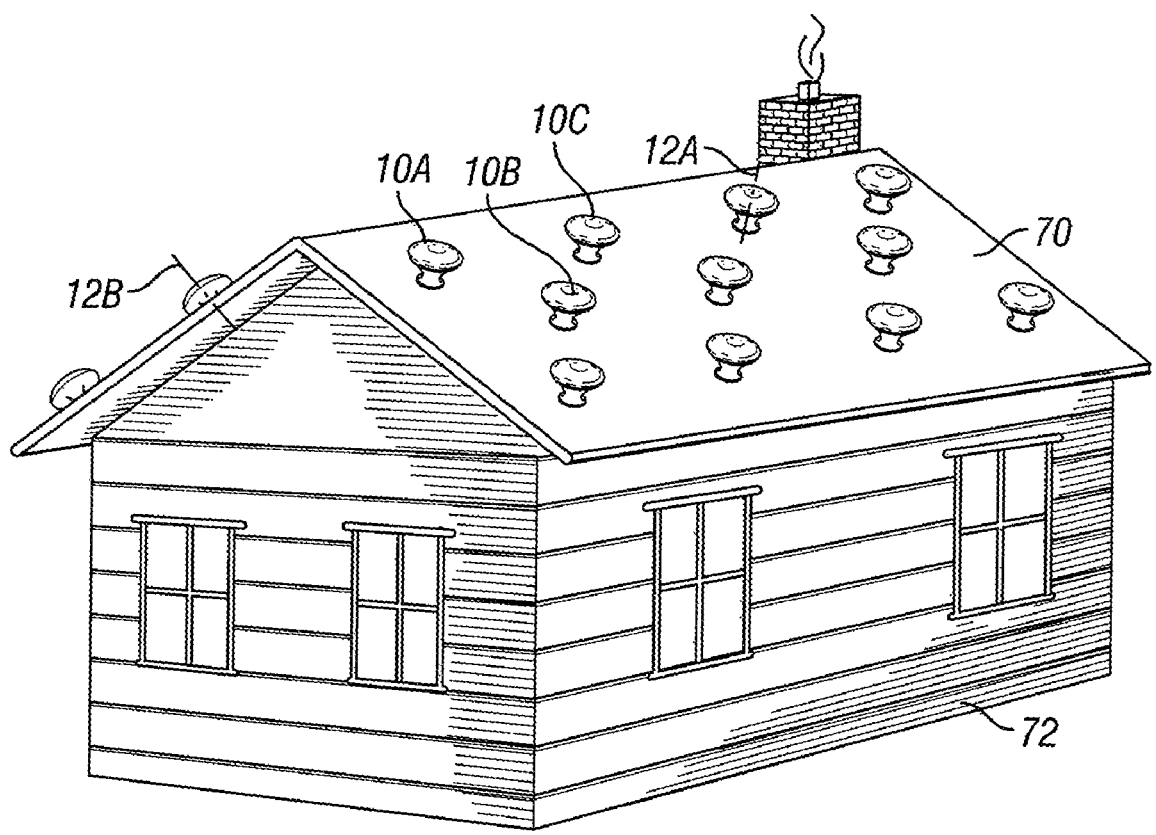
FIG. 6 is a perspective view of a building with a gabled rooftop employing a number of omni-directional airfoil assemblies of FIG. 1.

In one embodiment of the invention, FIG. 6 illustrates how airfoil assembly 10 (FIGS. 1-5) might be used to protect the rooftop 70 of building 72 from high winds. Building 72 includes a number of individual airfoil assemblies 10A, 10B, 10C, etc. secured to rooftop 70. Depending on the building and rooftop geometry, the airfoil assemblies 10A, 10B, 10C, etc. may be mounted such that vertical axis 12A is vertically oriented with respect to the earth. Alternatively, the airfoil assemblies 10A, 10B, 10C, etc. may be mounted to the rooftop 70 such that vertical axis 12B is oriented to be perpendicular to the plane of the rooftop 70 or oriented at some other appropriate angle. The number, size and placement of omni-directional airfoils may equally be varied to protect against varying levels of wind and to accommodate structural, cost and/or aesthetic constraints. The airfoils can ideally be used on both sloped (gabled) rooftops (FIG. 6) and on flat rooftops (not illustrated).

As illustrated in FIGS. 7 and 8, airfoil assembly 10 may be used on other structures besides stationary buildings. It may be used atop trailers, campers, mobile homes, motor-homes, buses, trucks, shipping canisters, rail cars, et cetera. For example, FIG. 7 illustrates the airfoils 10 used atop a camper trailer 80, and FIG. 8 illustrates the airfoils 10 used atop a rail car 85 and semi-trailers 90. The number, size and placement of omni-directional airfoils 10 may equally be varied to protect against varying levels of wind and to accommodate structural, cost and/or aesthetic constraints. The airfoils can ideally be used on both sloped (gabled) structure tops and on flat structure tops.

The Abstract of the disclosure is written solely for providing the United States Patent and Trademark Office and the public at large with a means by which to determine quickly from a cursory inspection the nature and gist of the technical disclosure, and it represents solely a preferred embodiment and is not indicative of the nature of the invention as a whole.

While some embodiments of the invention have been illustrated in detail, the invention is not limited to the embodiments shown; modifications and adaptations of the above embodiment may occur to those skilled in the art. Such modifications and adaptations are in the spirit and scope of the invention as set forth herein:

What is claimed is:

1. An omni-directional airfoil assembly (10) for mounting to a top of a structure (11) and creating a downward lift force thereon, comprising:
   a generally planar airfoil (20) characterized by having a circular planform and symmetry about an axis (12) normal to a first plane containing a circumference of said circular planform; and
   a base (30) having an upper-end connected to and carrying said airfoil;
   said airfoil further characterized in that each planar airfoil section, which is parallel to said axis, which defines an upper airfoil surface (21) connecting a leading edge point (22) and a trailing edge point (24), and which defines a lower airfoil surface (23) connecting said leading edge point and said trailing edge point, defines a mean camber line (28) that is located closer to said lower airfoil surface than a chord line (26);
   wherein said mean camber line connects said leading edge point and said trailing edge point and is formed by the locus of points halfway between said upper airfoil surface and said lower airfoil surface, as measured perpendicular to the mean camber line itself; and
   wherein said chord line is a straight line segment that connects said leading edge point and said trailing edge point;
   wherein said airfoil is substantially solid.

2. The airfoil of claim 1 wherein:
   said base is symmetric about said axis.

3. The airfoil of claim 1 wherein: said top of said structure is attached to a lower end of said base.

4. The airfoil of claim 1 wherein, said base is generally cylindrical and is coaxially located with said axis (12).

5. A method for producing a downward lift force on a portion of a top of a structure (70), the method comprising the steps of:
   attaching an omni-directional airfoil (10A) to said portion of said top, said omni-directional airfoil characterized by having a circular planform and symmetry about an axis (12) normal to a first plane containing a circumference of said circular planform, said airfoil further characterized in that for each of all possible planar airfoil sections that can be defined which are parallel to said axis, which define an upper airfoil surface (21) between a leading edge point (22) and a trailing edge point (24), and which define a lower airfoil surface (23) between said leading edge point and said trailing edge point where said lower airfoil surface is not obstructed, a mean camber line (28) is defined by the locus of points halfway between said upper airfoil surface and said lower airfoil surface, as measured perpendicular to the mean camber line itself, so that said mean camber line is located closer to said lower airfoil surface than a chord line (26), wherein said chord line is a straight line that connects said leading edge point and said trailing edge point;
   wherein said airfoil is substantially solid;
   subjecting said omni-directional airfoil to a wind; and
   creating by said omni-directional airfoil a downward lift force directed to said portion of said top.

6. The method of claim 5 further, comprising the step of:
   attaching a plurality of said omni-directional airfoils (10A, 10B, 10C) to said top.

7. The method of claim 5 further comprising the step of:
   attaching said omni-directional airfoil to a flat top.

8. The method of claim 5 further comprising the step of:
   attaching said omni-directional airfoil to a sloping top.

9. The method of claim 5 wherein:
   said top is a rooftop of a building.

10. The method of claim 5 wherein:
    said top is a vehicle top.

11. The method of claim 5 wherein:
    said top is a container top.

12. The method of claim 5 wherein:
    said top is a trailer top.

13. The method of claim 5 wherein:
    said top is a camper top.

14. The method of claim 5 wherein:
    said top is a rail car top.

* * * * *